United States Patent [19]

Sermanni-Giovannozzi et al.

[11] 3,860,710

[45] Jan. 14, 1975

[54] METHOD OF INHIBITING VIRAL LYSIS IN NONHUMAN FLORA AND FAUNA SYSTEMS

[75] Inventors: Giovanni Giovannozzi-Sermanni; Isabella Cacciari, both of Rome, Italy

[73] Assignee: Consiglio Nazionale delle Richerche, Rome, Italy

[22] Filed: May 19, 1972

[21] Appl. No.: 255,241

Related U.S. Application Data

[63] Continuation-in-part of Ser. No. 888,163, Dec. 29, 1969, abandoned, which is a continuation of Ser. No. 654,197, July 18, 1967, abandoned.

[30] Foreign Application Priority Data

July 26, 1966 Italy .................................. 37109/66

[52] U.S. Cl. ............................................... 424/195
[51] Int. Cl. ............................................ A61k 27/00
[58] Field of Search ...................................... 424/195

[56] References Cited

OTHER PUBLICATIONS

Giovannozzi–Sermanni, La Ric Sci., 1965, anno 35, Series 2, pp. 155–156.

*Primary Examiner*—Stanley J. Friedman
*Attorney, Agent, or Firm*—Karl F. Ross; Herbert Dubno

[57] ABSTRACT

Viral lysis in nonhuman biological systems is inhibited by treating the system with the noncytotoxic fraction obtained by gel filtration and subsequent elution of a primary fraction corresponding to the spectrometrically determined third chromatographic separation peak of an extract of Opuntia ficus-indica dialyzed against water. The disclosure also relates to the nontoxic active product and a method of obtaining same.

1 Claim, 2 Drawing Figures

METHOD OF INHIBITING VIRAL LYSIS IN NONHUMAN FLORA AND FAUNA SYSTEMS

CROSS-REFERENCE TO RELATED APPLICATIONS

The present application is a continuation-in-part of now abandoned application Ser. No. 888,163 filed 29 Dec. 1969 as a continuation of application Ser. No. 654,197 of July 18th 1967, now abandoned.

FIELD OF THE INVENTION

The present invention relates to a method of inhibiting viral lysis in nonhuman biological systems and, more particularly, to the prevention of lysis, to the delay of lysis and to the restriction of the extent of lysis in vivo and in vitro, especially in the living cells infected or infectable by virus in agricultural and veterinary applications. The invention also relates to a noncytotoxic product for this purpose and to improvements in obtaining or recovering such noncytotoxic active systems from Opuntia ficus-indica.

BACKGROUND OF THE INVENTION

Virus reproduction, generally described as lysis, requires a host in the form of living cells and an injection system, composed principally of genetic material known as the virus. The latter micro-organism is characterized, for the most part, by the inability to reproduce in the absence of genetic material derived from the host system. The virus, usually consisting of genetic material and some enzymatic agent, capable of penetrating the defenses of a living cell, may provide the reproductive template by which the genetic material of the cell is re-formed into images of the virus in the virus-reproducing system. In other words, virus reproduction will become effective only when they are found in cells which are responsive to them, so that the reproductive mechanism of the virus depends primarily upon the biochemical character of the parisitized cells. Attempts to inhibit viral lysis in biological systems, especially agricultural and veterinary nonhuman biological systems, have been complicated by the fact that the reproduction mechanisms of the viral nucleic acids do not differ substantially in their biogenesis from the nucleic acids and protein acids of the host cells.

For the foregoing reasons, the substances and treatment methods which have been employed heretofore for inhibition of viral lysis, ile. the prevention, retardation and limitation of lysis, also damage the host cells. Considerable attention has been directed in viral research into the development of a viralspecific substance which is not cytotoxic and yet is capable of inhibiting viral lysis to prevent or limit viral infections to which living cells of agricultural and veterinary subjects are susceptible.

We have discovered, for example, that Opuntia ficus-indica is effective to inhibit the reproduction of certain viruses such as bacteriophage in host systems providing bacteria cells, e.g. Escherichia coli (E. coli), see LA RICERCA SCIENTIFICA, anno 35, serie 2, parte II-B, vol. 6, n.2, p. 155–156, Roma, Aprile-Giugno 1965. However, Opunta ficus-indica extracts and products as described by us, were found to contain cytotoxic fractions detrimental to the host cell.

OBJECTS OF THE INVENTION

It is the principal object of the present invention to provide an improved method of treating nonhuman biological systems containing virus-infectable living cells, especially agricultural and veterinary subjects or hosts, to prevent, inhibit or restrict the effect of viral lysis whereby the aforementioned disadvantages are avoidable.

It is another object of this invention to provide an improved noncytotoxic system for inhibiting viral lysis in nonhuman hosts.

It is also an object of our invention to provide a method of obtaining the improved substance, free from cytotoxic agents.

Yet another object of the invention is to extend the principles of our earlier applications mentioned above.

SUMMARY OF THE INVENTION

As pointed out in our earlier applications identified above, our invention resides in the surprising discovery that it is possible to separate a substance capable of inhibiting viral lysis in agricultural and veterinary subjects or hosts, i.e. nonhumans, flora and fauna and yet avoid the cytotoxic effects hitherto associated with Opuntia ficus-indica by treating an extract of the latter. From earlier studies of Opuntia ficus-indica and the lysis-inhibiting effects thereof as detailed in our own application mentioned earlier, it was observed that ordinary separation methods were incapable of removing whatever cyclotoxic character may have been present in the substances obtained from Opuntia ficus-indica. Hence, it could only be assumed that whatever lysis-inhibiting character was present in Opuntia ficus-indica, it was always associated with cytotoxic properties.

As our prior applications have observed, this is not the case and it is possible to separate a highly active lysis-inhibiting component from whatever component may be the carrier of cytotoxic activity. More particularly, we have observed that, by homogenizing the cladodes of Opuntia ficus-indica and dialyzing the homogenized substance against an equal volume of distilled water over a period of about 48 hours at a temperature of about 4°C within conventional dialysis tubes, there is obtained a dialyzed or purified substance of a light-straw coloration which contains organic substances not further identifiable to date but which strongly inhibit the reproduction of infectious virus in agricultural or veterinary systems without disturbing the biochemistry of parisitized cells, as is evident by a substantially unchanged reproduction rate. In fact, in some cases, the host-cell reproduction rate is increased by the viral-lysis inhibition treatment.

The present invention thus resides in a substance for the inhibition of viral lysis in nonhuman living cell hosts which consists of a noncytotoxic secondary fraction obtained by gel filtration and subsequent elution of a primary fraction corresponding to the third spectrometrically analyzed chromatographic separation peak of an extract of Opuntia ficus-indica dialyzed against water. The method of inhibiting viral lysis in nonhuman, flora and fauna systems according to the invention involves the step of treating the virus host with the noncyctotoxic fraction thus obtained.

Of equal imporatnce is the method of obtaining the substance according to the present invention which involved the dialysis purification step mentioned earlier and may be described as comprising a chromatographic separation of the dialytically purified substance to obtain the third chromatographic separation peak. The substance corresponding to this peak is then subjected to gel filtration and elution to recover the lysis-inhibiting active fraction.

More specifically, the invention involves the formation initially of an Opuntia ficus-indica alcoholic extract, using any of the lower aliphatic alcohols, preferably having 1 to 4 carbon atoms. The Opuntia ficus-indica cladodes are advantageously cut up into small pieces which are extracted with the alcoholic extraction method, e.g. by the laboratory or industrial techniques described, see chapter 14 of PERRY'S CHEMICAL ENGINEERS' HANDBOOK McGraw-Hill Book Co., New York, 1963. The resulting extract is converted into a suspension, according to the invention, by drying the extract to form a residue and suspending the residue in water, the suspension being dialyzed by conventional techniques as described at pages 17 – 42 ff. of PERRY'S CHEMICAL ENGINEERS' HANDBOOK. The purified product is subjected to ion-exchange neutralization, i.e. deacidification and debasification, to produce a neutral effluent using ion-exchange resins such as Dowex 1 or Dowex 50. In more general terms, Dowex 1 represents an anion-exchange resin consisting of styrene-divinylbenzene copolymers with a quaternary ammonium functional group which is strongly basic with a capacity of 3.5 milliequivalents (meq) per ml of wet resin. The resin is strongly basic. Dowex 50 is representative of strongly acidic cation-exchange resins consising of styrene-divinylbenzene copolymers with sulfonic acid functional groups and a capacity in the $Na^+$ form of 4.8 meq/ml of the wet resin and a capacity in the $H^+$ form of 5.0 meq/ml.

The neutral effluent is, according to a further feature of the invention, dried under reduced pressure to produce a neutralized powder which serves as the starting material for a chromatographic separation using paper chromatography where the third effluent peak is collected and converted into a primary fraction by drying under reduced pressure.

This primary fraction is subjected to gel filtration and elution, upon any conventional chromatographic molecular-sieve gel using a gel column. While any of the molecular sieves may be used as described in the gel-filtration literature generally, we prefer to use Sephadex G 10 or any of the organic materials mentioned in table 16-2 of PERRY'S CHEMICAL ENGINEER'S HANDBOOK. More specifically, the gel filtration is carried out with a highly cross-linked polysaccharide molecular sieve such as cross-linked dextran (Sephadex G 10, see Heftman, FUNDAMENTALS OF CHROMATOGRAPHY, 1961, pages 329 ff. (Molecular Sieve Processes). The gel-filtration step separates the fraction AV+++, i.e. the lysis-active noncytotoxic substance which may be purified by a repeated gel filtration.

In general terms, the active substance may be applied directly or in any desired noncytotoxic excipient to the host which is to be treated. In the case of mosaic and like virus as in agricultural hosts, the active substance may be applied in suspension or emulsion, in water or in oil, by brush coating, spraying or nebulization or by dipping the host into the solution, suspension or dry-powdered active substance. Substantially any concentration from 0.01 to 100% of the active substance is effective because of its noncytotoxic character and when prolonged, lysis-inhibiting effects are desired, repeated applications can be used for an unlimited duration. In the case of farm animals and household pets, viral reproduction along the skin of the animal can be inhibited by applying the active substance in the manner set forth, together with conventional fungocides, antiseptic substances and the like. Animals, internally infected by virus, can receive the active ingredient by injection or in the feed.

DESCRIPTION OF THE DRAWING

The above and other objects, features and advantages of the present invention will become more readily apparent from the following description, reference being made to the accompanying drawing, in which.

SPECIFIC DESCRIPTION AND EXAMPLE

Figure 1:
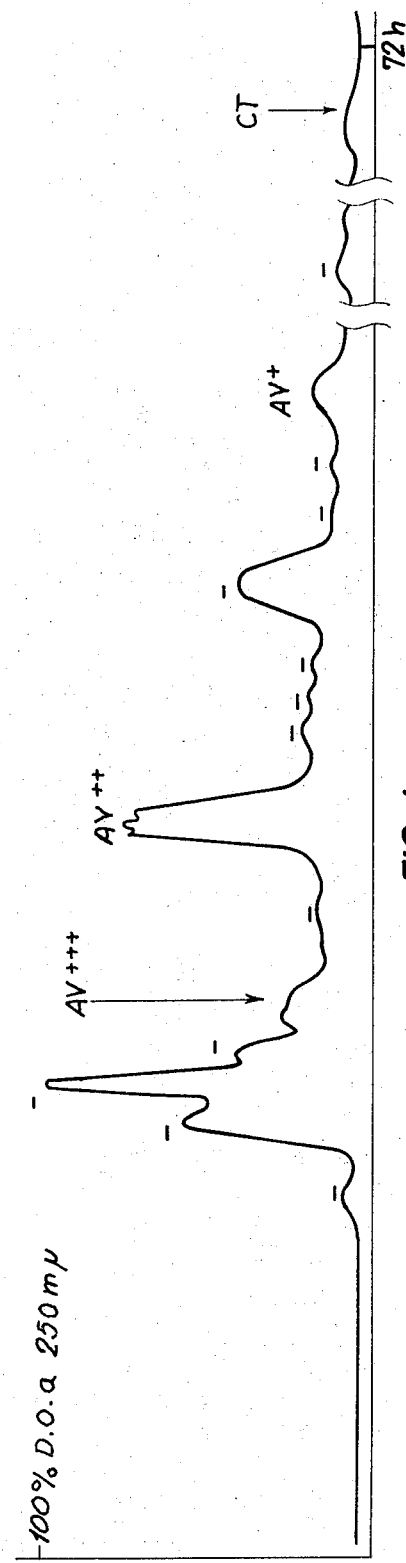
FIG. 1 is a spectrometer plot of the peaks illustrating the process of the present invention.
Figure 2:
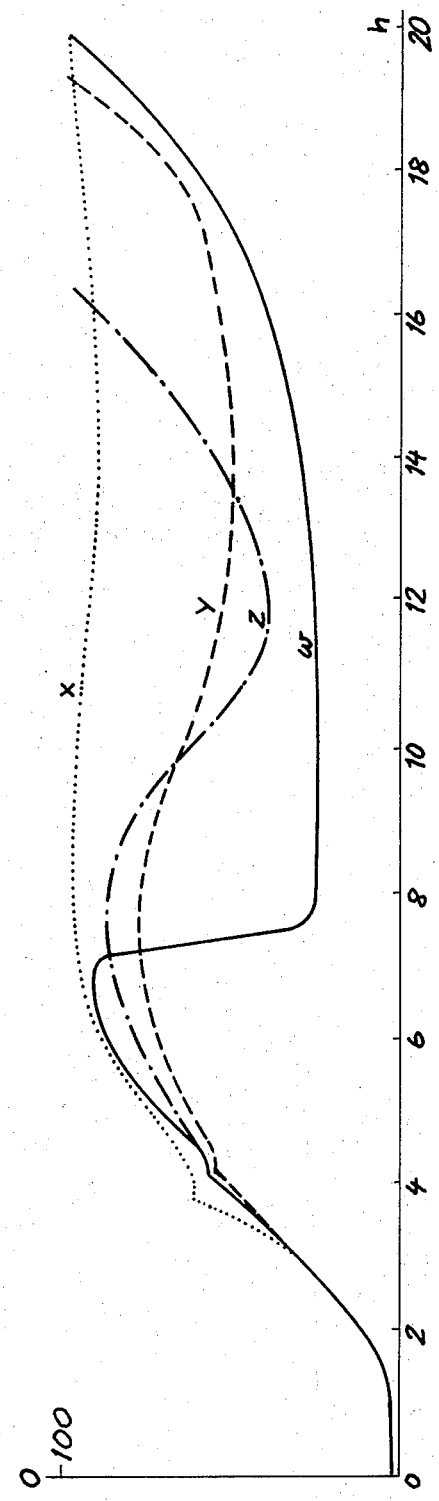
FIG. 2 is a graph showing results obtained with the present invention.

In FIG. 1 we show the curve of the fractionation of the Opuntia ficus-indica extract by the gel-filtration process while FIG. 2 shows the opacity curves O, as a function of time in hours (h), of the growth and the lysis of the *Escherichia coli*, infected by the bacteriophage (virus) T4, when different fractions of the extract are added, at different times. More precisely:

The curve W is that of the *Escherichia coli* + the bacteriophage.

The curve Z is that of the *Escherichia coli* + the bacteriophage + the dialyzed extract added 30 minutes after the bacteriophagic infection.

The curve Y is that of the *Escherichia coli* + the bacteriophage + the AV product (having the 0.15% final concentration added with the *Escherichia coli*).

The curve X is that of the *Escherichia coli* + the bacteriophage + the dialyzed extract added at the same time with the *Escherichia coli*.

The Opuntia ficus-indica cladodes are cut in pieces of about 2 cm × 2 cm and dried in a current of hot air at about 60°C.

The dried material is reduced to a powder and then extracted by means of a solvent, i.e. methanol, by maintaining the temperature at about 60°C during 48 hours in an extractor of the Soxhelet type of the like. The methanolic extract is dried under a reduced pressure; the residue is suspended again in water and dialyzed inside dialysis tubes at 4°C against an equal volume of water, which is rechanged three times. The dialysis process is carried out over a period of about 3 days. The dialyzed substances so obtained are pass through the ion-exchange resin columns for instance Dowex 1, Dowex 50 or other equivalent resins, in order to eliminate residual acidic or basic substances from the product.

The neutral effluent fraction is dried under reduced pressure and the residue is chromatographed on paper strips by means of butanol/water/acetic acid (4/2/3). The tail of the third effluent peak is collected, and pointed out by the spectrophotometer lecture (250 $\mu$), dried under a reduced pressure. Then the residue is subjected to at least a gel-filtration process by passing it through a Sephadex G 10 column of 120 cm length. The elution is effected with bidistilled water at a speed of about 6 ml/hour. Only the fraction corresponding to the peak indicated at AV+++ (FIG. 1) among the various separated fractions, has a noticeable antiviral activity. The fraction CT is cytotoxic.

The fraction AV+++ is then recycled at least another time on a column of a Sephadex G 10 type material, till an active peak is obtained, the yield of which is about 1.5 parts/million, relative to the starting product.

The product, chromatographed on the paper with normal movable phase butanol/acetic acid/water (4/3/2 V/V) gives a single spot with Rf = about 0.47.

Twenty-four hour cells of the *Escherichia coli* are sown in 20 ml of tryptone Difco liquor, containing 5% of NaCl and are grown at a temperature of 37°C during 150 minutes, with aeration of the culture with an air flow equal to 41$t/h$. After said period, 0.2 ml of the bacteriophagic (virus) suspension ($5.8 \times 10^8$ bacteriophages/ml) are added to the bacterial culture. The *Opuntia ficus-indica* extract, being sterilized by means of Seitz filter, can be added either before or after or during the addition of the bacterial virus.

Since the turbidity is the expression of the bacterial density, one notes that, by measuring the degree of the culture turbidity under examination, by means of a photometric apparatus, one finds that after about 6 hours from the viral infection, the *Escherichia coli* cultures, without the product, corresponding to the fraction AV+++ (full line curve), undergo a noticeable lysis which completely clears the culture.

The mixed curve Z of FIG. 2 corresponds to an *Escherichia coli* culture infected by bacteriophage T4, by adding a dialyzed extract 30 minutes after the bacteriophagic infection, while the dotted curve X foresees that the addition comprises the product of the invention, constituted by fraction AV+++ and the dashed cuve Y, and corresponds to the case in which the dialyzed extract has been added at the same time as the *Escherichia coli*.

It has to be noted that the product of the invention does not seem to have an antibiotic activity, nor to be cytotoxic for the living cells.

As described, the product of the invention is intended to be used in particular in agriculture and for veterinary purposes.

For the agriculture purposes, the product is prepared in solution, in water or oil, or under the emulsion form. It can be applied under these forms by nebulization or sprayings, either on vegetal individuals or on seeds. The dried product and in fine powder, added with suitable fluids can be applied under aerosol form. Obviously, it can be applied also in combination with other useful products for the same purpose, of course in the case in which these products are consistent with the product of the present invention.

We claim:

1. A method of producing a substance capable of inhibiting lysis of bacteriophage virus in a nonhuman host, said method comprising the steps of:
   a. cutting cladodes of *Opuntia ficus-indica* into pieces and drying same in a current of hot air at a temperature of about 60°C;
   b. powdering the pieces dried in step (*a*) and extracting the powder with methanol at a temperature of about 60°C for a period of about 48 hours to produce a methanolic extract;
   c. drying the methanolic extract under a reduced pressure to produce a residue;
   d. suspending said residue in water and dialyzing same against water at a temperature of 4°C over a period of about three days to obtain a dialyzed substance;
   e. passing the dialyzed substance through ion-exchange resin columns to eliminate acetic and basic substances, thereby obtaining a neutral effluent;
   f. drying the neutral effluent under reduced pressure to obtain a second residue;
   g. chromatographing the second residue on paper in butanol/water/acetic acid system consisting of butanol water and acetic acid in a ratio of about 4/2/3 and collecting the third effluent peak;
   h. drying the third effluent peak under the reduced pressure to produce a third residue;
   i. subject the third residue to gel filtration in a gel-filtration column and eluting the column with distilled water at a speed of about 6 milliliters per hour; and
   j. collecting a noncytotoxic fraction with lysis inhibiting activity and corresponding to AV+++ of FIG. 1 of the accompanying drawing to constitute the substance capable of inhibiting lysis.

* * * * *